No. 703,649. Patented July 1, 1902.
E. R. GILL.
SELF PROPELLED VEHICLE.
(Application filed Nov. 11, 1899. Renewed Nov. 15, 1901.)
(No Model.) 2 Sheets—Sheet 1.
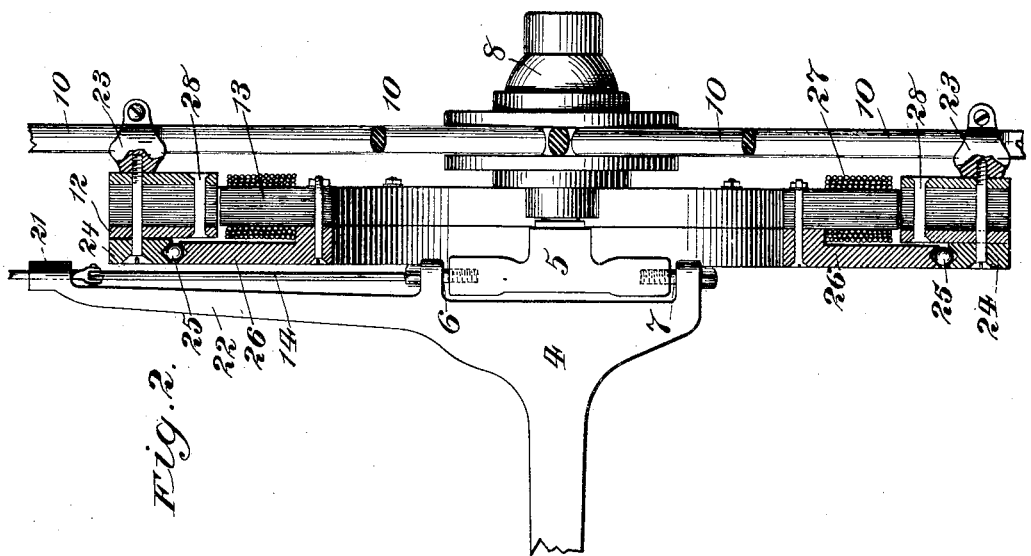
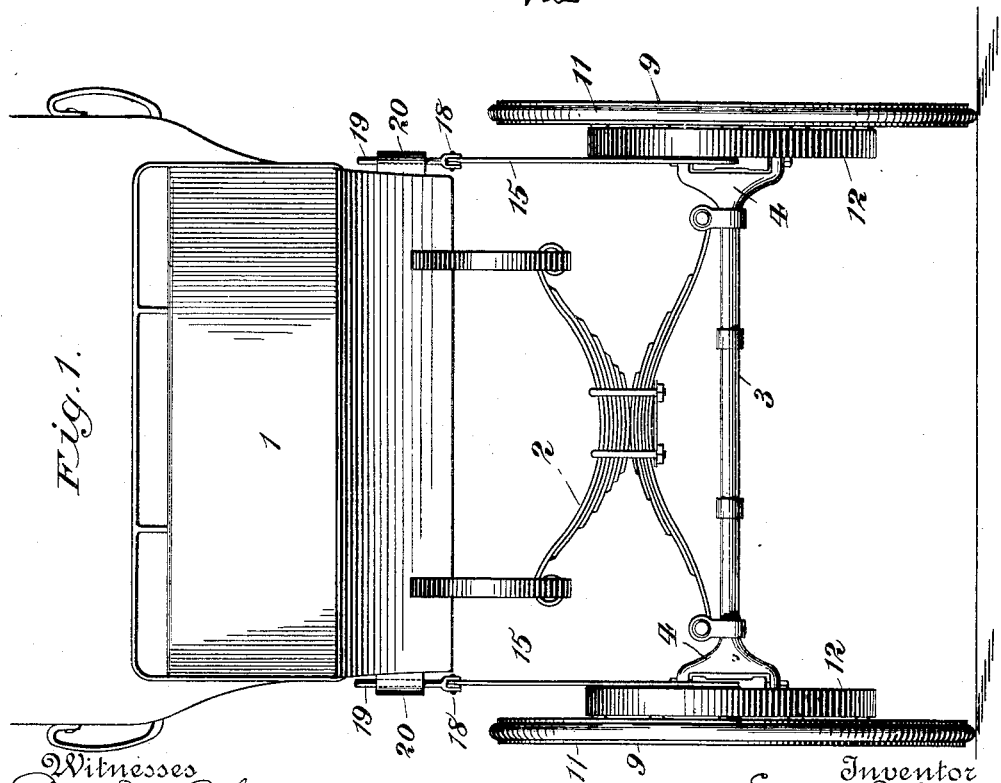
Witnesses
Edward C. Rowland
James S. Lunng
Inventor
Edwin R. Gill
By his Attorney
H. S. Mackaye

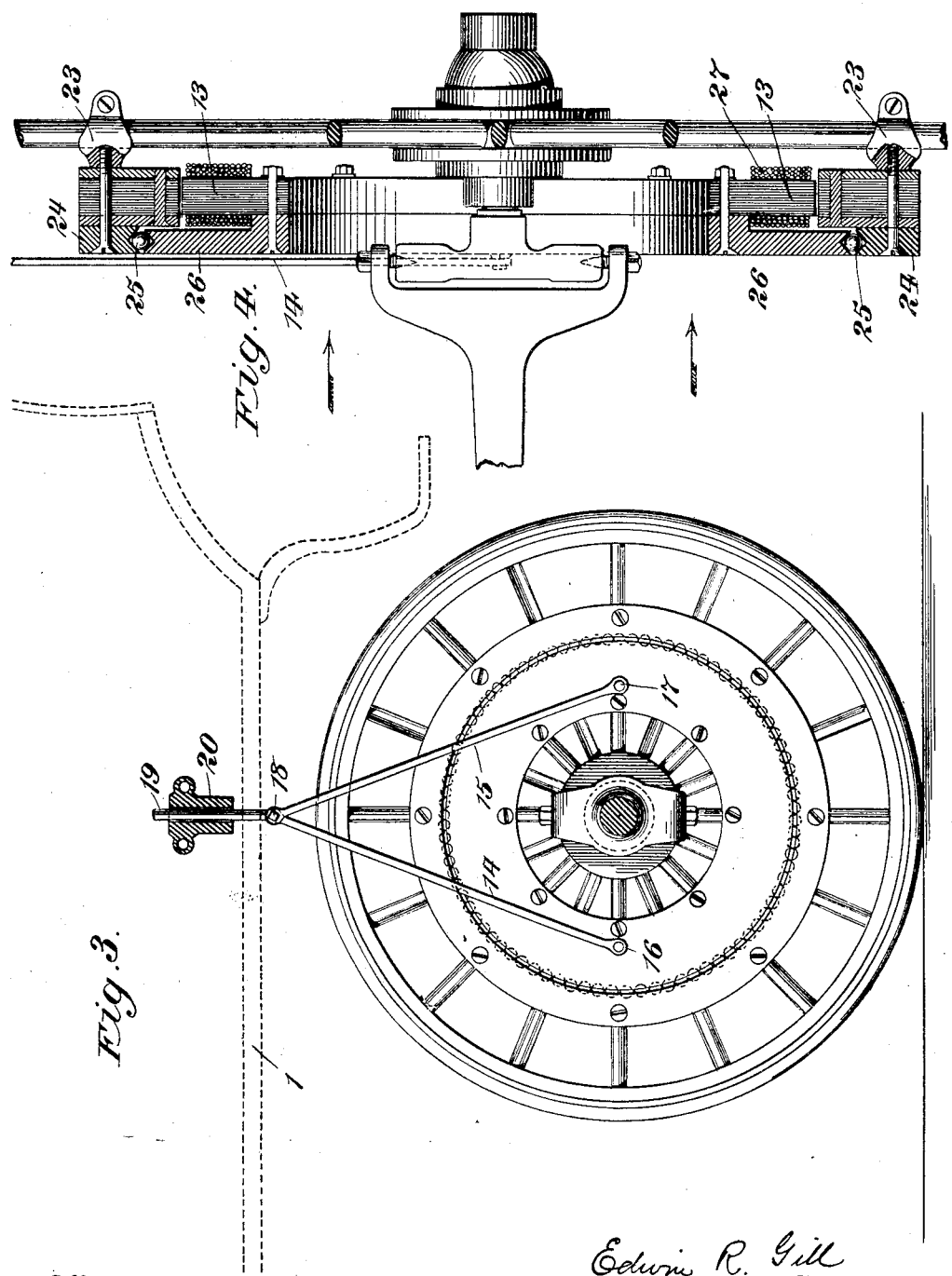

UNITED STATES PATENT OFFICE.

EDWIN R. GILL, OF ENGLEWOOD, NEW JERSEY.

SELF-PROPELLED VEHICLE.

SPECIFICATION forming part of Letters Patent No. 703,649, dated July 1, 1902.

Application filed November 11, 1899. Renewed November 15, 1901. Serial No. 82,411. (No model.)

*To all whom it may concern:*

Be it known that I, EDWIN R. GILL, a citizen of the United States, residing at Englewood, in the county of Bergen and State of New Jersey, have invented a certain new and useful Improvement in Self-Propelled Vehicles, of which the following is a specification.

My present invention relates to means whereby driving engines or motors may be mounted upon a vehicle for the propulsion thereof, and more particularly to the adaptation of electric motors to this end.

One object of my invention is the provision of means whereby motors having a stationary and a rotating part intended to coöperate in close juxtaposition therewith, as is the case with electric motors, may be mounted upon vehicles without employing carefully-adjusted devices for preventing shock.

My invention contemplates the division of the total driving power on one vehicle into a number of units, usually four, and thus lessening the actual shock to which each motor is subjected, as well as the parts that carry it, by reason of wheel vibrations.

Motors mounted in accordance with my invention may be efficiently used upon wagons of ordinary construction without getting out of order.

Another object of my invention is the provision of means whereby self-propelling vehicles may be provided with wheels, all of which are independently movable to change their planes of rotation. This facilitates the turning of vehicles of this class on a short curve.

A further object of my invention is the provision of a propulsive wheel unit capable of being adjusted to any vehicle.

Certain preferred embodiments of my invention are illustrated in the accompanying drawings, wherein—

Figure 1 is a front view of a light vehicle provided with wheels made in accordance with my present invention. Fig. 2 is a vertical section of my preferred motor mounted upon a common wheel having its rim removed and showing in elevation one form of my pivotal motor-abutment. Fig. 3 is an elevation of one of my wheel units seen from under the vehicle; and Fig. 4 is a view similar to Fig. 2, but showing the motor-abutment made as shown in elevation in Figs. 1 and 3.

In self-propelling vehicles as hitherto constructed it has been usual to provide driving-wheels turning upon or with axes having a fixed relation to the body of the vehicle, together with wheels made to turn at will for guiding the vehicle. In certain vehicles of special construction and capable of limited use, such as tricycles and bicycles, the driving-wheel has been heretofore placed in the median line of propulsion and has been so pivoted, together with its motor, as to permit of its fulfilling its functions of driving and guiding at once. It is one of the novel features of my present invention that I have provided means whereby this double function may be given to wheels which rotate out of the median line of propulsion, thus making all the wheels of any vehicle capable of both driving and guiding the same.

In self-propelling vehicles as heretofore constructed it has always been found necessary to provide extraordinary means for insuring rigid bearings of moving parts and for preventing all lost motion and vibration, particularly where gearing or electric motors are used. The unsightly, unwieldy, and expensive pneumatic tires used upon many automobiles present an instance of these special constructions for the purpose named. It is one of the advantages of my present invention that all need of these special constructions is obviated, while at the same time I obtain a maximum of durability and a minimum of expense in the motor-mounting. Hitherto in this art the self-propelling vehicle has been recognized as a highly-specialized type, designed throughout with the end in view of self-propulsion, and where it was intended to change from old forms of vehicle to the automobile the great waste entailed in discarding the whole of the old carriage has been a strong deterrent factor. By the use of my invention any form of carriage or wagon hitherto in use can be easily and quickly equipped with motors for self-propulsion at small cost and without requiring the services of specially-instructed labor. Moreover, in case of any accident each unit can be quickly removed and replaced.

It is a further advantage of my present invention that the application of the motor parts to the wheels does not require accurate workmanship and that in consequence damaged units can be easily repaired without sending back to the factory.

In Fig. 1 the body of a vehicle is shown at 1, mounted, as by springs 2, upon the stationary axle 3. As is common with the guiding-wheels of many automobiles, the ends of the axle 3 are provided with forks or sockets 4, between the parts of which the wheel-support 5 is adapted to fit, the same being pivoted in this position upon a vertical axis, as by the pins 6 and 7. The support 5 carries the shaft upon which turns the hub 8 of the wheels 9. These wheels may be of any desired pattern, and I have shown the common cart-wheel formed with spokes 10 and provided with a simple cushion-tire 11. The wheel itself carries its own propelling-motor, and this consists of any form of motor wherein there are two members, one of which is held stationary relative to the carriage-body and the other of which rotates in proximity thereto. To this class belongs the greater part of the known types of electric motor, and consequently I have shown in the drawings an armature 12, fixed upon the wheel 9, preferably on the inner face thereof, the same coöperating with a field-magnet, preferably within the armature, as shown at 13. The relative positions of these parts are not essential to the spirit of my present invention.

The field-magnet, as its name indicates, is that part which remains stationary with regard to the vehicle-body, and this stationary relation may be conserved by a variety of restraining means, preferably by means of the motor-abutment illustrated in two forms in the accompanying drawings. The essential features of this abutment are means for counteracting the rotative tendency of the field-magnet or other stationary part and means whereby said counteracting device may be given free vertical play to permit of vibration. Where the wheels are used for guiding, as in the preferred form of my invention, there must also be included an arrangement whereby swinging or pivotal movement is permitted.

In the form shown in Figs. 1, 3, and 4 I provide two bars 14 and 15, attached to the field-magnet, respectively, at 16 and 17 and pivoted together at 18 upon a pin 19, capable of turning within an appropriate bearing or socket 20, attached to the body of the vehicle. The pin 19 should be given free play up and down within the socket or bearing 20 to admit of free vibration of the body on its springs as well as to accommodate the vibration incident to the use of rubber or other tires. The bearing 20 being substantially in line over the pivotal pins 6 and 7, the whole abutment system is permitted to turn with the wheel around one axis of rotation, and thus the wheels may all be used for guiding as well as for driving.

In Fig. 2 is shown a modified form of device, wherein the pin 19 turns within the socket 21 on the end of an arm 22, attached to or forming part of the fixed axle-fork 4. The up-and-down play in this form need not be so great as in that before illustrated, since it need not accommodate the wide vibrations of the carriage-body on the springs 2.

In my preferred construction the armature consists of a ring 12, fastened to the wheel, as by means of clamps 23, clasping a number of spokes on each wheel. The details of form of these fastening means form no essential part of my present invention.

Upon the face of the armature 12 is fixed a bearing-ring 24, provided with an annular V-shaped bearing adapted to embrace steel balls 25 of the kind well known in ball-bearings.

The field-magnet 13 is adapted to rotate within the ring 12 of the armature and is itself made ring-shaped, with outwardly-directed poles in a manner well known in the electrical arts. The face of the field-magnet 13 carries the bearing-ring 26, provided with an outwardly-turned V-shaped bearing embracing the opposite sides of the balls 25. One or the other bearing-ring should overlap the space between the field-magnet and armature, and in the drawings I have shown the field-magnet ring overlapping in this manner. It will thus be seen that the field-magnet is supported on ball-bearings by the armature and that since this bearing maintains a rigid constant rotary relation between these two members of the driving-motor there is no necessity for provision of means for obviating shocks otherwise productive of relative movement between said members. It is obvious that duplication of these features for purposes of additional solidity is within the scope of my present invention. The subdivision of the total driving-motor weight on a vehicle into four units contributes to lessen danger from vibratory shocks. It will be further evident that accurate concentric adjustment between the parts of the motor and the center of rotation of the wheel is unnecessary and that considerable eccentricity can be permitted without detriment. It is also possible to mount the motor members 12 and 13 upon the wheel without producing parallelism between the planes of rotation of the motor and wheel. Both of these accidental variations are permissible in my invention without detriment to the working of the motors by reason of the flexible abutment or restraining means which I employ. The latitude in accuracy of construction permissible in these two particulars is most important, both as touching the building and repair of the wheel units and also as permitting great wear at the main bearings and hub, as well as accidental malformation of wheel without practical detriment. In prior forms of automobile it has always been necessary to produce accurate concentric adjustment, as well as to carefully adjust and maintain the proper plane of rotation of the members of the driving-motor. It will be readily seen that my construction permits of self-propulsion for every type and grade of vehicle, however rough and cheap.

Wheels of any form can be equipped with the motor substantially as shown and described herein and will then constitute units applicable to any vehicle by simply slipping them on and screwing up the fastening-nut, as in wheels in common use. If any accident occurs, an extra wheel, which may be carried in the vehicle, can be at once adjusted and the journey continued without delay.

If it is desired to make all the wheels of a vehicle act for guiding, the units can be made to include the body 5 and short main journal attached thereto. In either case pivotal abutments may be used and vertically-sliding means should always be employed, even where the wheel is not intended for guidance, since the free up-and-down play is always desirable. Of course the form of abutment used with non-guiding wheels forms no part of the essentials of my invention as applied to the restraining means nor is my invention confined to the use with any wheels of the precise form of abutment shown and described herein.

It will be seen that I have shown a winding 27 in the drawings applied to the field-magnet poles, while merely indicating by the copper bars 28 that the armature is formed for receiving currents by induction. In other words, I have shown one form of rotary field alternating-current motor applied to the wheels in the drawings. This has been done to exemplify the advantages of my device and the flexibility of the type to which it belongs. My invention, most broadly considered, covers any rotary motor applied, as claimed, to the wheels themselves, whether electric or not, and if an electric motor be used it may be a direct-current motor or may belong to any well-known class of alternating-current motors.

Of course where freely-running vehicles are used wherein conductors for leading current to the motors from a fixed station are inapplicable batteries may be carried and where desired may be made to supply alternating currents of any desired number of phases by the use of any well-known form of rotary transformer. The control of the vehicle without loss of power is greatly facilitated by the use of four or more units, since they can be thrown into series or multiple or multiple series in various ways to produce variations in effort in a well-known manner. The wheels may be made to act as brakes or their direction of movement may be reversed by proper manipulation of the driving-currents, as well understood in the electrical arts. All these features form no essential part of my invention, but are mentioned in order to illustrate the variety of manipulations to which my invention lends itself.

What I claim is—

1. As an article of manufacture, a vehicle-wheel and a rotary motor having its rotating part carried on said wheel and its fixed part supported on said wheel in fixed rotary relation to said rotating part.

2. As an article of manufacture, a vehicle-wheel and a rotary motor having its rotating part fixed to said wheel and its fixed part supported in ball-bearings by said rotating part.

3. As an article of manufacture, a vehicle-wheel, a ring-shaped armature fastened thereto, a bearing-ring on the face of said armature-ring, a ring-shaped field-magnet adapted to rotate within said armature-ring, a bearing-ring fixed to the face of said field-magnet ring, and ball-bearings between said bearing-rings for supporting said field-magnet.

4. As an article of manufacture, a common spoke-wheel adapted to turn upon a journal, a rotary driving-motor having its two members supported upon said wheel and clamps for fastening said motor to the spokes thereof.

5. In a vehicle, a wheel, a ring-shaped armature fixed thereto, a ring-shaped field-magnet adapted to rotate within said armature, a bearing-ring on said armature, and a bearing-ring on said field-magnet, said rings being concentric and one of said rings overlapping the circle separating said armature and field-magnet.

6. In a self-propelled vehicle, a wheel adapted to turn normally out of the median plane of traction, a rotary motor attached to said wheel, means adapted to restrain rotary movement of one member of said motor and a device for attaching said restraining means permitting of vertical play.

7. In a self-propelled vehicle, a wheel adapted to turn normally out of the median plane of traction, a rotary motor attached to said wheel, a vertically-pivoted body carrying said wheel, restraining means for one member of said motor and a device for fixing said restraining means while permitting vertical play and pivotal movement thereof.

8. In a self-propelled vehicle, a wheel and axle on a vertical pivot, a rotary motor fixed on said wheel, bars pivoted to the opposite sides of the fixed member of said motor, a pin pivoted at a common point to said bars, and a socket immovable with relation to the vehicle-body and substantially in line with said vertical pivot of the wheel, for receiving said pin.

EDWIN R. GILL.

Witnesses:
JAMES S. LAING,
NELSON HISS.